June 18, 1963  D. F. BURDICK ETAL  3,094,446
SILICONE RUBBER COMPOSITIONS
Filed Nov. 7, 1960
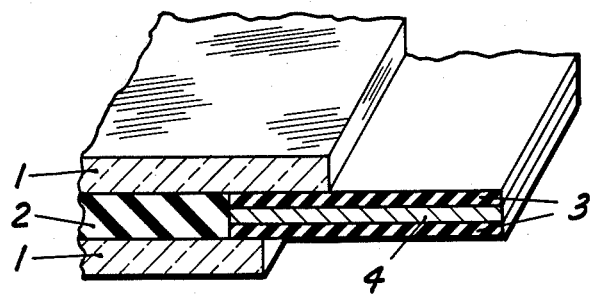
INVENTORS
DUANE F. BURDICK
KEITH E. POLMANTEER
BY Robert F. Fleming Jr.
ATTORNEY

United States Patent Office 3,094,446
Patented June 18, 1963

3,094,446
SILICONE RUBBER COMPOSITIONS
Duane F. Burdick and Keith E. Polmanteer, Midland, Mich., assignors to Dow Corning Corporation, Midland, Mich., a corporation of Michigan
Filed Nov. 7, 1960, Ser. No. 67,656
5 Claims. (Cl. 154—2.7)

This invention relates to novel silicone rubber compositions containing an epoxide additive.

Transparent silicone rubber compositions such as those described in Canadian Patent No. 588,250 are useful as interlayers for transparent windshields. These materials have met with considerable commercial success for use in windshields on automotive vehicles. In spite of the essential thermal stability and weather resistance of organosiloxane rubbers, it has been found that these transparent organopolysiloxane rubbers tend to crack upon exposure to sunlight under certain atmospheric conditions. It is believed that the cracking is due to the presence in the atmosphere of sulfur compounds such as $SO_2$ or $H_2S$, which react with moisture under the influence of ultraviolet light to produce acidic sulfur compounds. These acidic compounds then react with the polysiloxane to cause degradation of the polymer.

It has been suggested that acid acceptor compounds such as calcium carbonate or the like, might be effective for reducing the deterioration of these transparent siloxane rubbers. However, the use of such acid acceptors leaves much to desire.

One of the essential properties of any silicone rubber employed as an interlayer is that it must have adequate adhesion to the glass so that the windshield will not shatter when fractured. Consequently, any material employed with the silicone rubber to improve the resistance to deterioration must also give adequate adhesion to glass.

Furthermore, in many applications it is necessary to have a metal insert around the edges of the silicone rubber glass laminate in order that the windshield can be adequately anchored to the frame of the vehicle. Consequently, it is highly desirable that the silicone rubber have as high an adhesion to the metal as possible.

It is the object of this invention to provide a novel silicone rubber composition which will protect transparent silicone rubber interlayer from degradation in a sulfur atmosphere. Another object of this invention is to provide a novel silicone rubber which shows improved adhesion to metals, particularly aluminum. Another object is to provide a silicone rubber of improved atmospheric stability. Other objects and advantages will be apparent from the following description.

This invention relates to a vulcanizable silicone rubber composition consisting essentially of a diorganopolysiloxane in which the organic groups attached to the silicon are methyl, phenyl, vinyl or 3,3,3-trifluoropropyl, at least 50 percent of the total number of said groups being methyl and from 5 to 15 parts per 100 parts polysiloxane of dicyclopentadienedioxide.

The essential ingredient in the compositions of this invention is the dicyclopentadienedioxide which has the formula

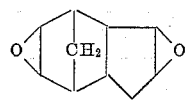

This product is an article of commerce and is sold under the name of Unox Epoxide 207. This material is a crystalline solid and can be mixed with the silicone rubber polymer in any convenient manner such as milling and the like.

For the purpose of this invention the molecular size of the diorganopolysiloxane is not material. The polymers can range from thin fluids to non-flowing gums.

The organopolysiloxane of this invention can be vulcanized by any of the conventional methods for vulcanizing siloxane rubbers. Suitable vulcanizing agents include peroxides such as: benzoyl peroxide, dicumyl peroxide, ditertiarybutyl peroxide, tertiarybutylperacetate, dichlorobenzoyl peroxide, dichlorodicumyl peroxide and tertiarybutyl perbenzoate. The polysiloxanes can also be vulcanized by combinations of silicates such as methylpolysilicate, ethylpolysilicate, propylorthosilicate and β-methoxyethylsilicate and catalysts such as, lead octoate, dibutyl tin diacetate or dibutyl tin dilaurate; combinations of the above silicates with amines such as, dibutylamine, n-hexylamine or octadecylamine; combinations of SiH containing organosilicon compounds such as methylhydrogen polysiloxane, ethylhydrogen polysiloxane or tetramethyldisiloxane with catalysts such as dibutyltindilaurate, ferric octoate or dibutyltindiacetate, or combinations of said SiH containing siloxanes with platinum such as platinum on charcoal or chloroplatinic acid (the last system requires alkenyl groups in the diorganopolysiloxane). If desired, the siloxane can be vulcanized with ionizing radiation such as ultraviolet light, X-ray, beta-rays or electrons or the siloxane can be vulcanized by heat alone.

Preferably the siloxanes of this invention should contain fillers such as metal oxides such as titania, alumina, zinc oxide or ferric oxide, or silicas such as diatomaceous earth, crushed quartz, fume silicas, silica aerogels or finely divided precipitated silicas such as those sold under the name Hi-Sil. If desired these fillers, particularly the silica fillers, can have organosiloxy groups attached to the surface thereof. Such modified silicas can be made by any of the conventional methods such as by reacting silicas with halo- or alkoxysilanes such as dimethyldichlorosilane, trimethylethoxysilane or phenyldimethylchlorosilane or by reacting them with organosiloxanes such as dimethylsiloxane or hexamethyldisiloxane.

This invention also relates to glass-siloxane rubber laminates which are protected from deterioration by sealing the edges thereof with the composition of this invention. This protection is best brought about by placing a strip of the composition of this invention entirely around the border of the transparent siloxane rubber-glass laminate, thereby protecting the transparent interlayers from the deteriorating effects of sulfur gases. In practice it is often desirable to have a metal insert around the edges of the laminate so that the latter can be conveniently attached to the frame of the automotive vehicle.

For a better understanding of this feature of applicants' invention recourse can be had to the accompanying drawing which represents a corner of one embodiment of the present invention. This drawing is an elevation of the corner showing a transparent silicone rubber interlayer 2 between two plates of glass 1. Inserted between the glass along the edges thereof is an edge attachment comprising a metal sheet 4 between two sheets of the composition of this invention 3. The latter serve to seal the edges of the laminate to prevent harmful gas from penetrating to the transparent rubber 2.

It should be understood that many other embodiments of laminates sealed around the edges with the composition of this invention can be made without departing from the scope of this invention. A strip of the composition of this invention can seal the edges between the two panes of glass without any metal insert being present. Another alternative is to form the composition of this invention in the form of a gasket which fits over both plates of glass without extending there between. Such a gasket serves as a seal between the laminate and the frame of the vehicle.

It should be understood that the compositions of this invention are useful in any applications for silicone rubber requiring improving resistance to sulfur gases and better adhesion to metal surfaces, particularly to aluminum.

The following examples are illustrative only and should not be construed as limiting the invention which is properly delineated in the appended claims.

EXAMPLE 1

The composition employed in this example was prepared by milling (1) 100 parts of a copolymer of dimethylsiloxane, methylvinylsiloxane and phenylmethylsiloxane, said copolymer having a Williams plasticity of 50, (2) 30 parts of a finely divided silica filler having trimethylsiloxy groups attached to the surface thereof in amount such that the ratio of trimethylsiloxy groups to $SiO_2$ units of the silica polymer is greater than .06:1, (3) 3 parts ethylpolysilicate, (4) .2 part dicumylperoxide and (5) 7.8 parts of dicyclopentadienedioxide.

A laminate was prepared by placing a sheet of transparent organopolysiloxane rubber on a pane of glass and then placing around the edges of this transparent rubber, a strip of the composition above described so that the composition of this invention extended inwardly from all four edges of the glass from ⅜ to 1 inch. A second piece of glass was placed over both the silicone rubbers and the assembly was laminated by heating under pressure at 150° C. for 30 minutes. This formed a laminate composed of two panes of glass held together with vulcanized silicone rubber compositions in which the edges were sealed with the composition of this invention shown above.

The laminate was then placed in an atmosphere of sulfur gas and exposed to ultraviolet light from three 765 watt General Electric UA11 bulbs. The temperature during exposure was 244° F. The samples were observed daily and the appearance and progression of cracks in the transparent silicone rubber interlayer were observed. The distance any cracks had penetrated into the transparent interlayer from the edges thereof was measured in inches. The results are shown in the table below:

Table I

| Parts of Epoxide per 100 parts (1) | Distance of Crack Extension, inches | Time in Days |
|---|---|---|
| 5.2 | 1⅝ | 20 |
| 7.8 | 1/16 | 20 |
|  | none | 27 |

The identical compositions shown above were applied to sheets of aluminum so as to give a coating 75 mils thick. Each sample was then vulcanized by heating in an autoclave 30 minutes at 150° C. under 200 p.s.i. oil pressure. The samples were then removed from the autoclave. Some of the samples were cured 24 hours at 150° C. and some were cured for 100 hours at 150° C. The adhesion of the rubber to the aluminum was then measured by cutting strips of the coating ½ inch wide and pulling these away from the surface of the aluminum at a 90° angle. The force in pounds per inch of width required to do this is recorded as the adhesion. The results are shown in the table below:

Table II

| Parts of Epoxide per 100 parts of (1)— | Adhesion | |
|---|---|---|
|  | After 24 hrs. at 150° C. | After 100 hrs. at 150° C. |
| 5.2 | 36.4 | 48.5 |
| 7.8 | 77.2 | [1] 99.6 |
|  | [1] 119 | [1] 102.5 |

[1] Cohesive failure.

EXAMPLE 2

The composition employed in this example was 100 parts of a copolymer of dimethylsiloxane and methylvinylsiloxane, 30 parts of a fume silica, 15 parts diotomaceous earth, .2 part dicumylperoxide, 9 parts of a fluid hydroxylated polysiloxane and 7.8 parts of dicyclopentadienedioxide. This formulation when vulcanized gave good protection to transparent silicone rubber interlayer. It also had superior adhesion to aluminum as shown by the fact that the adhesion after curing and heating 24 hours at 150° C. was 35 pounds, whereas the adhesion to aluminum of the same composition containing no epoxide under identical conditions was only 23 pounds.

EXAMPLE 3

Equivalent results was obtained when a copolymer of 3,3,3-trifluoropropylmethylsiloxane and methylvinylsiloxane is substituted in the procedure of Example 1.

That which is claimed is:

1. A vulcanizable siloxane rubber composition consisting essentially of (1) a diorganopolysiloxane in which the organic radicals are selected from the group consisting of methyl, phenyl, vinyl and 3,3,3-trifluoropropyl radicals, at least 50 percent of said radicals being methyl, (2) from 5 to 15 parts based on 100 parts of the diorganosiloxane of dicyclopentadienedioxide, and (3) a vulcanizing agent.

2. A vulcanized organosiloxane rubber consisting essentially of (1) a diorganopolysiloxane in which the organic groups are selected from the group consisting of methyl, phenyl, vinyl and 3,3,3-trifluoropropyl radicals, at least 50 percent of said radicals being methyl, (2) from 5 to 15 parts per 100 parts diorganopolysiloxane of dicyclopentadienedioxide, and (3) a filler.

3. A silicone rubber in accordance with claim 1 where the filler is a silica filler.

4. A transparent laminate comprising alternate layers of glass and a transparent vulcanized silicone rubber in which the edges of said laminate are sealed with a vulcanized silicone rubber composition consisting essentially of (1) a diorganopolysiloxane in which the organic groups are selected from the group consisting of methyl, phenyl, vinyl and 3,3,3-trifluoropropyl radicals, at least 50 percent of said radicals being methyl, (2) from 5 to 15 parts per 100 parts diorganopolysiloxane of dicyclopentadienedioxide, and (3) a filler.

5. A laminate in accordance with claim 4 in which the filler is a silica filler.

References Cited in the file of this patent

UNITED STATES PATENTS

| 2,692,844 | Hyde | Oct. 26, 1954 |
| 2,962,453 | Phillips et al. | Nov. 29, 1960 |

FOREIGN PATENTS

| 187,900 | Austria | Dec. 10, 1956 |